United States Patent
Huang (10) Patent No.: US 10,110,882 B2
(45) Date of Patent: Oct. 23, 2018

(54) STEREO DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 113 days.

(21) Appl. No.: 15/291,083

(22) Filed: Oct. 12, 2016

(65) Prior Publication Data
US 2018/0020211 A1    Jan. 18, 2018

(30) Foreign Application Priority Data
Jul. 12, 2016 (TW) .............................. 105121847 A (51) Int. Cl.
*G03B 21/26* (2006.01)
*H04N 13/04* (2006.01)
(Continued)

(52) U.S. Cl.
CPC ....... *H04N 13/317* (2018.05); *G02B 27/2214* (2013.01); *H04N 13/305* (2018.05);
(Continued)

(58) Field of Classification Search
CPC ........... H04N 13/0415; H04N 13/0418; H04N 13/0447; H04N 13/0497; G02B 27/2214
(Continued)

(56) References Cited

U.S. PATENT DOCUMENTS 5,231,464 A * 7/1993 Ichimura .............. A61B 5/0059
250/227.11
6,661,475 B1* 12/2003 Stahl .................... H04N 9/3105
348/E9.027
(Continued)

FOREIGN PATENT DOCUMENTS

CN     102096200 B    4/2012
EP       0791847 B1    1/2003
(Continued)

OTHER PUBLICATIONS

Yong Seok Hwang et al., Optimized design of directional backlight system for time-multiplexed auto-stereoscopic display based on VHOE, Proc. of SPIE-IS&T Electronic Imaging, SPIE vol. 9011, 2014, p. 901111-1~901111-6.

*Primary Examiner* — Helen Shibru
(74) *Attorney, Agent, or Firm* — CKC & Partners Co., Ltd.

(57) ABSTRACT

A stereo display device includes a light source module, an image determining array, an imaging module, and a spatial dividing element. The light source module sequentially emits first and second lights to target regions in different directions. The image determining array includes pixel units respectively disposed in the target regions, and each of the pixel units sequentially provides first and second information to the first and second lights respectively. The imaging module guides the first light having the first information to form first imaging units, and guides the second light having the second information to form second imaging units. The spatial dividing element sends the first image units to first viewing regions respectively and sends the second image units to second viewing regions respectively, and two of the (Continued)

first image units corresponding to adjacent two of the pixel units are transmitted to the first viewing regions in different directions.

10 Claims, 7 Drawing Sheets

(51) Int. Cl.
    *H04N 13/317* (2018.01)
    *H04N 13/32* (2018.01)
    *H04N 13/351* (2018.01)
    *H04N 13/398* (2018.01)
    *G02B 27/22* (2018.01)
    *H04N 13/305* (2018.01)
    *G02B 5/02* (2006.01)

(52) U.S. Cl.
    CPC ........... *H04N 13/32* (2018.05); *H04N 13/351* (2018.05); *H04N 13/398* (2018.05); *G02B 5/0273* (2013.01)

(58) Field of Classification Search
    USPC ............ 353/30, 31, 7, 38, 34; 359/577, 556; 348/51
    See application file for complete search history.

(56) References Cited

U.S. PATENT DOCUMENTS

| | | | |
|---|---|---|---|
| 8,427,527 B2 | 4/2013 | Visser et al. | |
| 8,947,605 B2 | 2/2015 | Eichenlaub et al. | |
| 9,163,929 B2* | 10/2015 | Lim | A61B 5/0066 |
| 9,612,520 B2* | 4/2017 | Huang | G03B 35/26 |
| 9,829,714 B2* | 11/2017 | Huang | G02B 27/2235 |
| 9,915,773 B1* | 3/2018 | Huang | G02B 6/005 |
| 2010/0165464 A1* | 7/2010 | Lin | G02B 3/0037 359/570 |
| 2012/0057134 A1* | 3/2012 | Huang | G02B 27/26 353/8 |
| 2012/0236403 A1 | 9/2012 | Sykora et al. | |
| 2013/0016323 A1* | 1/2013 | Huang | G02B 5/04 353/33 |
| 2013/0169707 A1* | 7/2013 | Li | G02B 9/34 345/697 |
| 2014/0098418 A1* | 4/2014 | Lin | G02B 27/2214 359/463 |
| 2014/0362600 A1* | 12/2014 | Suckling | F21S 48/1225 362/583 |
| 2015/0226973 A1* | 8/2015 | Huang | G02B 27/2214 353/7 |
| 2015/0268546 A1* | 9/2015 | Huang | G03B 21/2073 349/5 |
| 2015/0323304 A1* | 11/2015 | Sekine | G01N 21/45 356/451 |
| 2016/0041399 A1* | 2/2016 | Huang | G02B 27/26 362/231 |
| 2016/0073100 A1* | 3/2016 | Huang | G02B 26/0833 353/7 |
| 2016/0134861 A1* | 5/2016 | Huang | G02B 27/2221 353/7 |
| 2017/0176338 A1* | 6/2017 | Wu | G06T 7/90 |
| 2017/0211771 A1* | 7/2017 | Nishimura | F21S 48/125 |
| 2017/0276952 A1* | 9/2017 | Huang | H04N 13/0409 |
| 2017/0276953 A1* | 9/2017 | Huang | G02B 3/0043 |
| 2017/0285357 A1* | 10/2017 | Huang | G02B 27/22 |
| 2017/0307245 A1* | 10/2017 | Itaya | G05B 23/0232 |
| 2017/0363741 A1* | 12/2017 | Send | G06F 3/0304 |

FOREIGN PATENT DOCUMENTS

| | | |
|---|---|---|
| TW | 201326972 A1 | 7/2013 |
| TW | 201433827 A | 9/2014 |
| TW | 201544847 A | 12/2015 |

* cited by examiner

STEREO DISPLAY DEVICE

RELATED APPLICATIONS

This application claims priority to Taiwan Application Serial Number 105121847, filed Jul. 12, 2016, which is herein incorporated by reference.

BACKGROUND

Field of Invention

The present invention relates to a stereo display device.

Description of Related Art

With the development of technology, an optical product capable of showing stereoscopic image has been put under the spotlight in the consumer market. By exploiting the binocular parallax, a stereoscopic display device can display images individually to the two eyes of an observer through optical elements, such that the observer can experience a stereoscopic image. In other words, by exploiting the binocular parallax of humans, the stereoscopic display device can respectively provide different images to the two eyes of the observer, thereby achieving stereoscopic display.

Unlike the types of stereoscopic display devices which require special glasses to distinguish left-eye and right-eye images, an autostereoscopic display device can show the stereoscopic image without the glasses. The autostereoscopic display device can transmit light beams of different images to different spatial positions. Therefore, the eyes of an observer receive different images from different angles so that the observer perceives a stereoscopic image without the special glasses. Since the autostereoscopic display technology address the problems associated to the inconvenience of glasses, it has become an important topic in the related fields.

SUMMARY

In the embodiments of the present invention, by exploiting a spatial dividing element in accompanied by sequential imaging of light sources, a number of viewing regions of different spatial positions where lights are transmitted can be increased, thereby enhancing the range of viewing sweet spot and reducing the range of edge viewing regions where a stereoscopic display cannot be achieved by binocular parallax.

According to one aspect of this invention, a stereo display device includes a light source module, an image determining array, an imaging module, and a spatial dividing element. The light source module is configured to sequentially emit a first light and a second light to a plurality of target regions, wherein the first light and the second light propagate in different directions. The image determining array includes a plurality of pixel units respectively disposed in the target regions, and each of the pixel units sequentially provides a first information to the first light and a second information to the second light. The imaging module is disposed adjacent to the image determining array, and the imaging module is configured to guide the first light having the first information passing the pixel units to form a plurality of first imaging units, and to guide the second light having the second information passing the pixel units to form a plurality of second imaging units. The spatial dividing element is configured to send the first image units to a plurality of first viewing regions respectively and send the second image units to a plurality of second viewing regions respectively, the first viewing regions and the second viewing regions are substantially not overlapped, and two of the first image units corresponding to adjacent two of the pixel units are transmitted to the first viewing regions in different directions.

In some embodiments of the present invention, the first light and the second light are substantially parallel lights propagating in the different directions.

In some embodiments of the present invention, the spatial dividing element includes a plurality of slanted cylindrical lenses, the pixel units are arrayed in a first direction and a second direction, and an extending direction of the slanted cylindrical lenses is not parallel with the first direction and the second direction, wherein each of the slanted cylindrical lenses in the first direction covers M number of the pixel units, wherein M is a positive integer, and each of the slanted cylindrical lenses has a slant angle $\delta$ of $\tan^{-1}(1/M)$.

In some embodiments of the present invention, a sum width of each of the first image units and each of the second image units is $\cos(\delta)/M$ times a length of the pixel units of the image determining array.

In some embodiments of the present invention, the stereo display device further includes a diffusing film, configured to allow the first image units and the second image units formed thereon.

In some embodiments of the present invention, the imaging module includes a plurality of lenses, and each of the lenses is disposed corresponding to each of the pixel units.

In some embodiments of the present invention, the imaging module includes a first cylindrical lens and a second cylindrical lens. The first cylindrical lens is disposed at a side of the image determining array. The second cylindrical lens is disposed at another side of the image determining array, wherein an extension direction of the first cylindrical lens is substantially orthogonal to an extension direction of the second cylindrical lens.

In some embodiments of the present invention, the light source module includes at least one first light source, at least one second light source, and a lens. The first light source and the second light source respectively radiate a first radiated light and a second radiated light. The lens is configured to convert the first radiated light and the second radiated light to the first light and the second light, which are parallel lights.

In some embodiments of the present invention, the light source module further includes a controller, configured to switch the first light source and the second light source sequentially.

In some embodiments of the present invention, the light source module includes a light source array and a lens array. The light source array includes a plurality of light source components arranged in an array, and each of the light source components includes a first light source and a second light source, respectively radiating a first radiated light and a second radiated light. The lens array is configured to convert the first radiated light and the second radiated light to the first light and the second light, which are parallel lights, and each of the light source components is disposed corresponding to a lens of the lens array.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
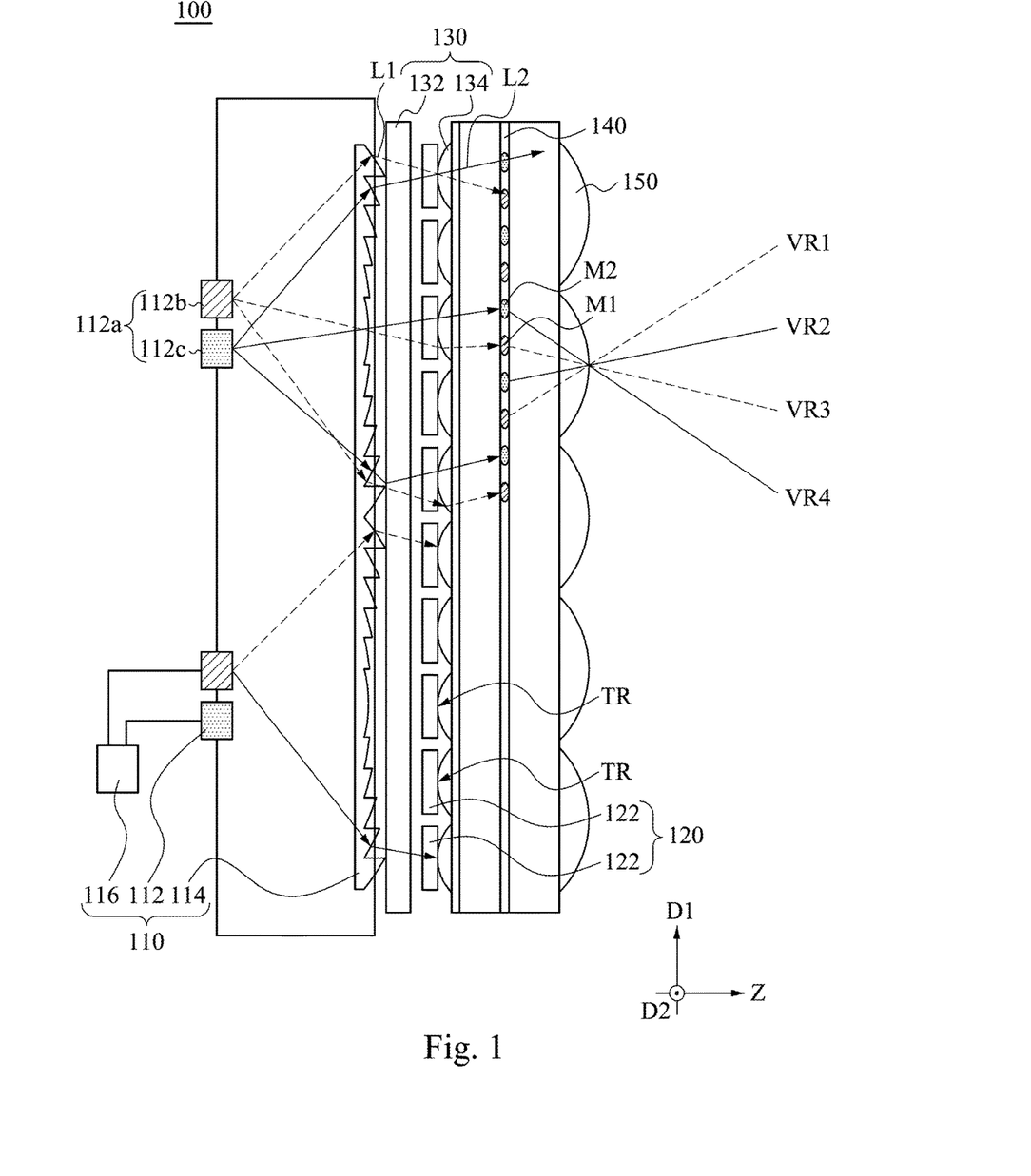
FIG. 1 is a schematic side view of a stereo display device according to an embodiment of this invention.

FIG. 1 is a schematic side view of a stereo display device 100 according to an embodiment of this invention. The stereo display device 100 includes a light source module 110, an image determining array 120, an imaging module 130, a diffusing film 140, and a spatial dividing element 150. In the embodiments of the present invention, the light source module 110 is configured to sequentially emit a first light L1 and a second light L2 to at least one target region TR, wherein the first light L1 and the second light L2 propagate in different directions. The image determining array 120 includes at least one pixel unit 122 disposed in the target region TR, and each of the pixel units 122 sequentially provide a first information to the first light L1 and a second information to the second light L2. The imaging module 130 is disposed adjacent to the image determining array 120, and the imaging module 130 is configured to guide the first light L1 having the first information to form a plurality of first imaging units M1 on the diffusing film 140, and to guide the second light having the second information to form a plurality of second imaging units M2 on the diffusing film 140. Herein, since the first light L1 and the second light L2 propagate in different direction, the first imaging units M1 and the second imaging units M2 are not formed at the same position. Due to the position difference, the spatial dividing element 150 can send the first image units M1 to a plurality of first viewing regions VR1 and VR3 respectively and send the second image units to a plurality of second viewing regions VR2 and VR4 respectively, in which the first viewing regions VR1 and VR3 and the second viewing regions VR2 and VR4 are substantially not overlapped. Through the configuration, the light source module 110 and the spatial dividing element 150 can provides different images to the left and right eyes of a user by time-multiplex and spatial-multiplex methods. Herein, the first viewing regions VR1 and VR3 are referred to the viewing regions where the first light L1 is output; the second viewing regions VR2 and VR4 are referred to the viewing regions where the second light L2 is output.

In other words, in some embodiments of the present invention, the light source module 110, the image determining array 120, and the imaging module 130 constitute an imaging system, such as a projecting system. The imaging system is configured to sequentially form the first image units M1 and the second image units M2 at different positions on the diffusing film 140, and further work with the spatial dividing element 150 so as to send the first image units M1 to the first viewing regions VR1 and VR3 respectively and send the second image units M2 and to the second viewing regions VR2 and VR4 respectively.

The configurations of the light source module 110, the image determining array 120, the imaging module 130, and the spatial dividing element 150 are illustrated in the followings.

Figure 2:
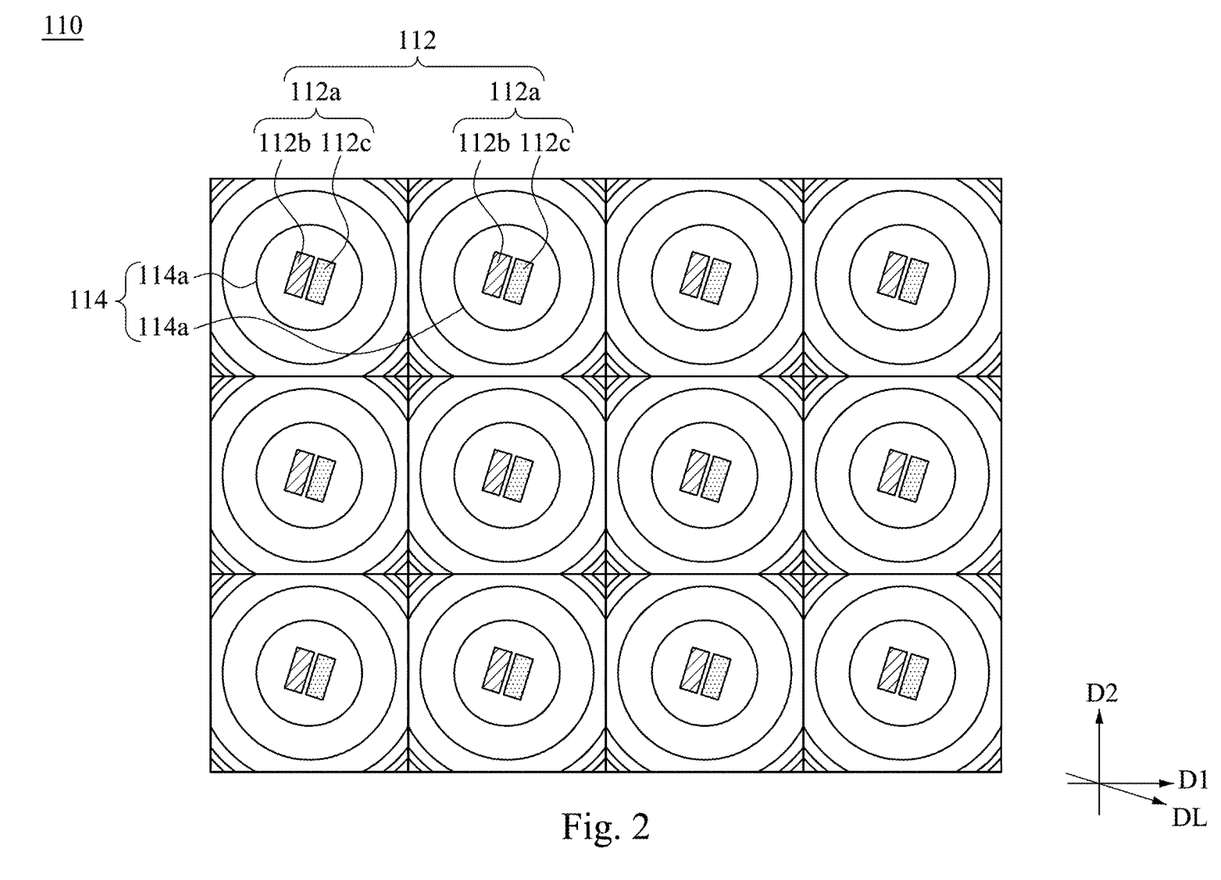
FIG. 2 is a schematic top view of a light source module of the stereo display device of FIG. 1.

Reference is made to FIG. 1 and FIG. 2. FIG. 2 is a schematic top view of a light source module 110 of the stereo display device 100 of FIG. 1. Herein, the light source module 110 includes a light source array 112, a lens array 114, and a controller 116. To be specific, the light source array 112 may include a plurality of light source components 112a arranged in an array. Each of the light source components 112a includes a first light source 112b and a second light source 112c, respectively radiating the first light L1 and the second light L2. Herein, the first light source 112b and the second light source 112c of each of the light source components 112a may be connected to the controller 116, which is configured to sequentially switch the first light source 112b and the second light source 112c of each of the light source components 112a. The lens array 114 includes a plurality of lenses 114a, wherein each of the light source components 112a is disposed corresponding to each of the lenses 114a of the lens array 114. Herein, the lenses 114a are arrayed in a first direction D1 and a second direction D2 orthogonal to the first direction D1, but it should not limit the real applications.

Figure 3:
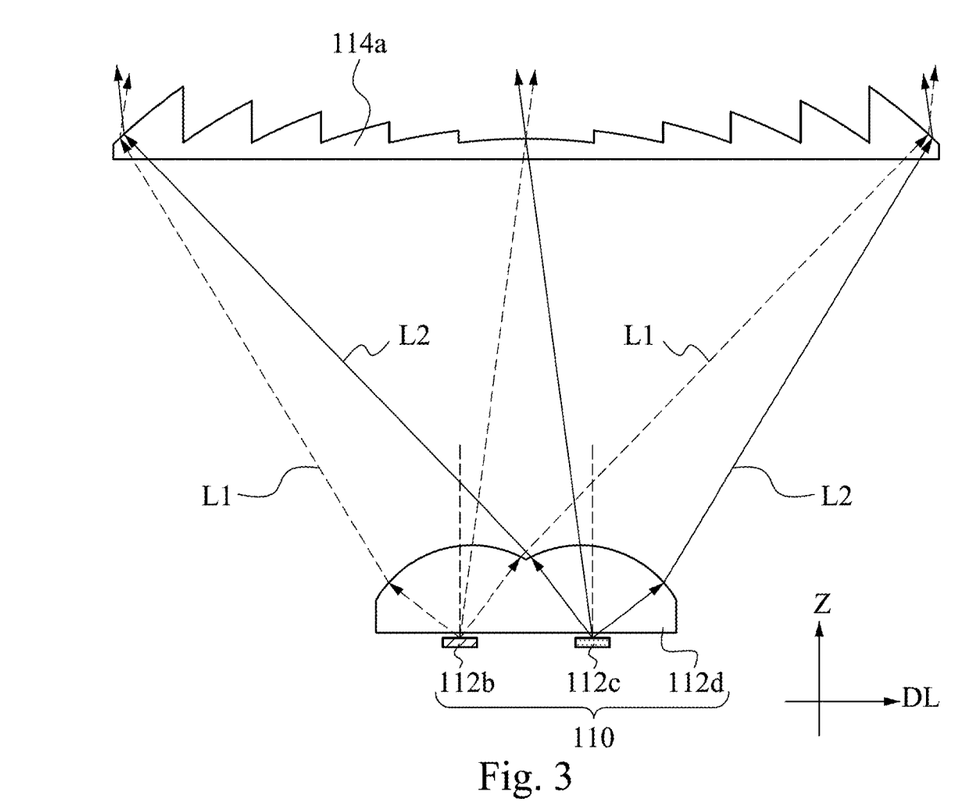
FIG. 3 is a schematic side view of a portion of the light source module of the stereo display device of FIG. 1.

Reference is made to FIG. 1 to FIG. 3. FIG. 3 is a schematic side view of a portion of the light source module 110 of the stereo display device 100 of FIG. 1. Herein, the positions of the first light source 112b and the second light source 112c are substantially at the focal plane of the lens array 114, such that the lens array 114 may convert the radiated first light L1 to a parallel light with its propagating direction, and convert the radiated second light L1 to a parallel light with its propagating direction. The propagating direction of the first light L1 is different from the propagating direction of the second light L2, and the position of the first light source 112b is adjacent to the position of the second light source 112c, such that an angle between the propagating directions of the first light L1 and the second light L2 is limited and thereby prevented the first light L1 and the second light L2 from diverging too much. Herein, a focal point of each of the lenses 114a of the lens array 114 is disposed between the first light source 112b and the second light source 112c of each of the corresponding light source components 112a, such that a distance between the focal point and the first light source 112b and a distance between the focal point and the second light source 112c are allocated evenly as much as possible. Through the configuration, the distance between the focal point and the first light source 112b and the distance between the focal point and the second light source 112c are reduced as much as possible, and thereby achieving an optical performance which is produced in a condition that light sources are disposed at the focal point. Of course, it should not limit the scope of the present invention, the first light source 112b and the second light source 112c may be disposed at the same side of the focal point of the corresponding lens 114a. Herein, after passing through the lens array 114, the first light L1 is parallel light, the second light is also parallel light, and the first light L1 and the second light L2 are directional back-lights propagating in two split directions respectively. It should be understood that, in real applications, the first light L1 and the second light L2 may be designed according to the configuration of other elements, such as the image determining array 120 and the imaging module 130, and are not limited to be parallel lights.

In some embodiments, each of the light source component 112a may include a packaging structure 112d cooperating with the first light source 112b and the second light source 112c, and the first light source 112b and the second light source 112c of each light source component 112a may be arranged in a packaging structure 112d. The packaging structure 112d may be configured to guide lights emitted from each light source component 112a, such the lights emitted from each light source component 112a is transmitted to the corresponding lens 114a. The packaging structure 112d may be formed by transparent material, such plastic and glass, the refractive index of the transparent material is greater than that of air, and therefore the packaging structure 112d is capable of changing propagation directions of light. For example, the packaging structure 112d has two curved surfaces connected to each other, and the two centers of the curved surfaces are located corresponding to the first light source 112b and the second light source 112c respectively, such that one of the curve surfaces may guide most light emitted from the first light source 112b, another of the curve surfaces may guide most light emitted from the second light source 112c.

In some embodiments, as shown in FIG. 3, the first light source 112b and the second light source 112c are arranged in a direction DL, such that the propagating directions of the first light L1 and the second light L2 are constituted of the direction Z and the direction DL, in which the direction Z is orthogonal to the first direction D1 and the second direction D2, and the direction DL is parallel to a plane of the direction D1 and the direction D2. Herein, after passing through the lens 114a of the lens array 114, the first light L1 and second light L2 respectively have a component of a vector in the direction DL, and a positive or negative sign of the component of the first light L1 in the direction DL is opposite to that of the second light L2. In the embodiments of the present invention, the direction DL is designed in accordance with other elements, such as the imaging module 130 and the spatial dividing element 150, which will be illustrated later.

In some embodiments of the present invention, the first light L1 and the second light L2 may be white lights (having visible spectrum). For example, the first light source 112b and the second light source 112c can be blue light emitted diodes, and the packaging structure 112d can have YAG yellow fluorescent powder, such that white light can be generated. Of course, it should not limit the scope of the present invention, and in other embodiments, the first light L1 and the second light L2 may be lights with specific spectrums.

Herein, the lens array 114 may be composed of a plurality of fresnel lenses or solid lenses. Herein, each of sets of the light source components 112a and the lenses 114a is disposed corresponding to a corresponding one of the plurality of target regions TR, but it should not limit the related actual application. In fact, the sets of the light source components 112a and the lenses 114a may not be arranged corresponding to the target regions TR respectively. It may be the only design requirement that the whole light source module 110 is capable of providing light (such as parallel light) to the target regions TR and sequentially altering the propagating direction of the light.

Referring back to FIG. 1, the image determining array 120 includes a plurality of pixel units 122, which are arrayed in the first direction D1 and the second direction D2 orthogonal to the first direction D1. In the whole text of the present specification, the first direction D1 and the second direction D2 refer to the directions where the pixel units 122 are arrayed. Other elements may be optionally arranged along the first direction D1 and/or the second direction D2 depending on the actual conditions. In some embodiments, when a user observes the stereo display device 100 in a normal direction, a line connecting two eyes of the user may be substantially parallel with the first direction D1.

The pixel units 122 are respectively disposed at the target regions TR. Ideally, the distribution ranges of the first light L1 and the second light L2 are substantially the same in each of the target regions, such that each of the pixel units 122 may receive the first light L1 and the second light L2 uniformly. Of course, it should not limit the scope of the present invention, while the actual operation may vary due to errors and precise issues of fabrication processes.

The pixel units 122 may at least provide the first information and the second information in a time sequence where the first light L1 and the second light L2 are emitted. The first information and the second information may be referred to one of various features of the pixel units 122 that endow the light passing through it with a specific property, such that a brightness variation is observed by human eyes. For example, the first information and the second information may be transmittance or phase retardation of the pixel units 122 with respect to the lights passing through the pixel units 122.

In some embodiments, the image determining array 120 may cooperate with a color filter array (not shown), so that the output lights show specific colors. To be specific, the pixel units 122 may include a plurality of sub-pixels, the sub-pixels of each of the pixel units 122 is corresponded to each of color units of the color filter array. For example, each of the pixel units 122 includes three sub-pixels, which are respective arranged corresponded to a red color unit, a green color unit, and a blue color unit, and therefore lights emitted from the each of the pixel units 122 may be colored. For example, the image determining array 120 may be a two-dimensional spatial light modulator (SLM), which may cooperate with appropriate polarizers to control the transmittance. The SLM includes a plurality of liquid crystal cells, which are independently controlled, and the liquid crystal cells may respectively act as the sub-pixels of the pixel units 122.

In some embodiments of the present invention, the imaging module 130 includes a plurality of first cylindrical lenses 132 arrayed in a series (which is a lenticular lens) and a plurality of second cylindrical lenses 134 arrayed in a series (which is another lenticular lens). The first cylindrical lenses 132 are disposed at a side of the image determining array 120. The second cylindrical lenses 134 are disposed at another side of the image determining array 120, in which an extension direction of the first cylindrical lenses 132 is substantially orthogonal to an extension direction of the second cylindrical lenses 134. Each of intersected areas of the first cylindrical lenses 132 and the second cylindrical lenses 134 is disposed corresponding to each of the pixel units 122. Accordingly, the imaging module 130 has lens power in both the first direction D1 and the second direction D2, so that the first imaging units M1 and the second imaging units M2 may be imaged onto the diffusing film 140.

It should be noted that, the arrangement of the first cylindrical lenses 132 and the second cylindrical lenses 134 should not limit the possible configurations of the imaging module 130. In some other embodiments, the first cylindrical lenses 132 and the second cylindrical lenses 134 may be disposed at the same side of the image determining array 120, such as a front side or a back side. In still other embodiments, the imaging module 130 may be a lens array, which includes a plurality of lenses, and each of the lenses is disposed corresponding to each of the pixel units 122.

In some embodiments of the present invention, the diffusing film 140 has properties of low-haze, high luminance, and high-transmittance. It should be noted that the configuration of the diffusing film 140 is not necessary, and the diffusing film 140 may be omitted in some suitable designs.

Figure 4A:
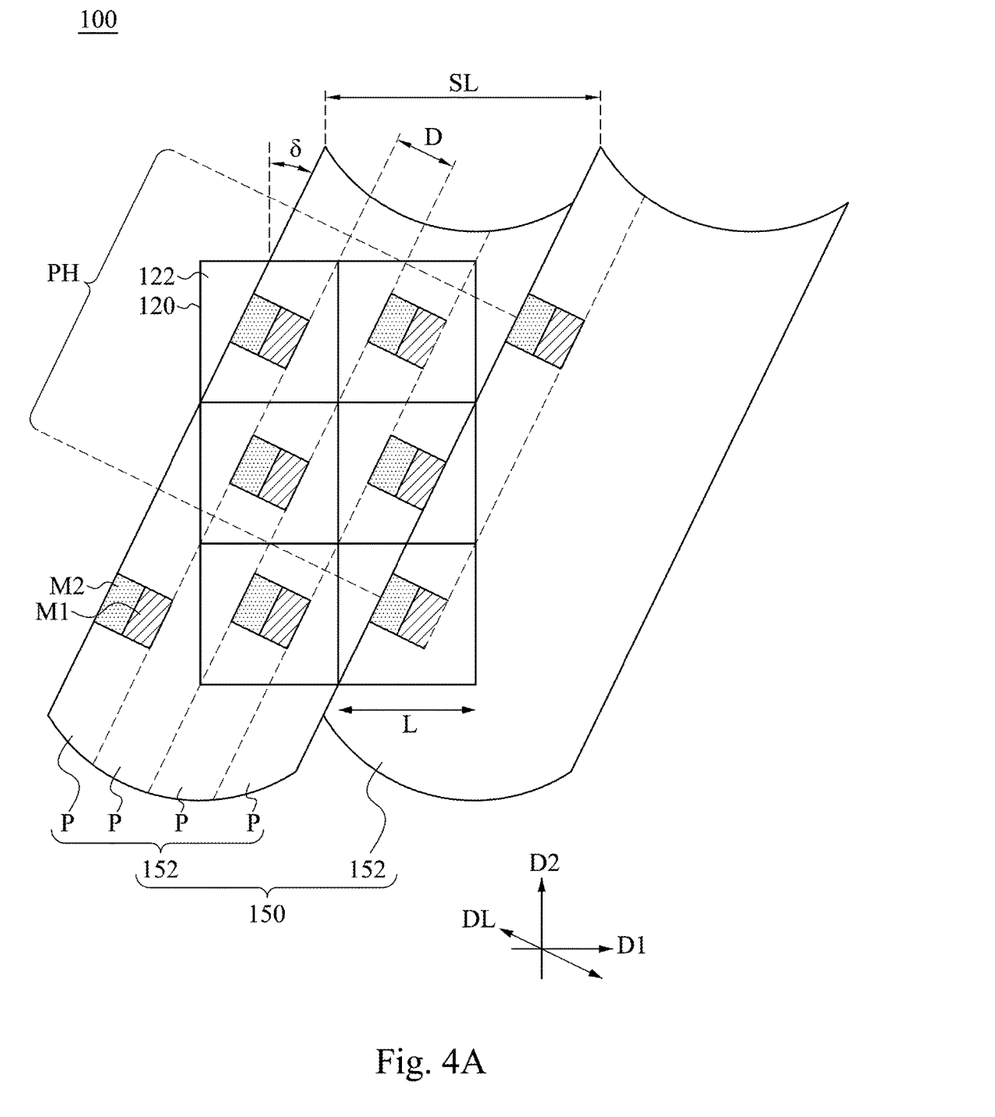
FIG. 4A is a schematic top view of a portion of elements of a stereo display device according to an embodiment of this invention.
Figure 4B:
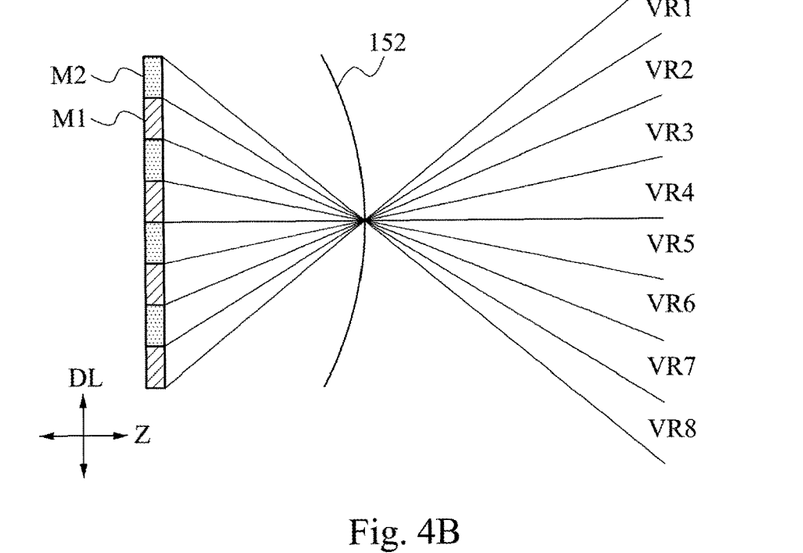
FIG. 4B is a schematic view showing optical paths of the stereo display device of FIG. 4A.

Reference is made to FIG. 1, FIG. 4A, and FIG. 4B. FIG. 4A is a schematic top view of a portion of elements of the stereo display device 100 according to an embodiment of this invention. FIG. 4B is a schematic view showing optical paths of the stereo display device 100 of FIG. 4A. In some embodiments of the present invention, the spatial dividing element 150 includes a plurality of slanted cylindrical lenses 152, and an extending direction of the slanted cylindrical lenses 152 is not parallel with the first direction D1 and the second direction D2. In some embodiments, the extending direction of the slanted cylindrical lenses 152 is orthogonal to the direction DL. Herein, owing to the fact that vectors of the propagating directions of the first light L1 and the second light L2 has a component in the direction DL, and a component of the vectors of the first light L1 and the second light L2 in the direction DL have opposite signs, the first imaging units M1 and the second imaging units M2 formed by each of the pixel units 112 are arranged along the direction DL.

Herein, each of the slanted cylindrical lenses 152 has a plurality of segments PH periodically arranged in the extending direction. In each of the segments PH, the first imaging units M1 and the second imaging units M2 are formed in a substantially the same arrangement. Each of the slanted cylindrical lenses 152 has a plurality of portions P arranged side by side, and each of the portions P has substantially the same extending direction, which is the same as the extending direction of the slanted cylindrical lenses 152. In each of the segments PH, each of the portions P is arranged corresponding to at least one of the first imaging units M1 and at least one of the second imaging units M2. Through the configuration, in each of the segments PH, the first imaging units M1 are disposed corresponding to different portions P, and the second imaging units M2 are disposed corresponding to said different portions P. In other words, in each of the segments PH, the first imaging units M1 and the second imaging units M2 are not overlapped in the direction DL. Through the configuration, referring to FIG. 4B, in each of the segments PH, the slanted cylindrical lenses 152 may projected the first imaging units M1 and the second imaging units M2 to the first viewing regions VR1, VR3, VR5, and VR7 and the second viewing regions VR2, VR4, VR6, and VR8 at different angles in the direction DL, in which the first viewing regions VR1, VR3, VR5, and VR7 and the second viewing regions VR2, VR4, VR6, and VR8 are not overlapped with each other. To be specific, the spatial dividing element 150 projects the first imaging units M1 respectively corresponding to the pixel units 122 (which are four herein) to the first viewing regions VR1, VR3, VR5, and VR7 in different directions, and the spatial dividing element 150 projects the second imaging units M2 respectively corresponding to the pixel units 122 (which are four herein) to the second viewing regions VR2, VR4, VR6, and VR8 in different directions.

The details of the configuration and the design of the slanted cylindrical lenses 152 are related to the pixel units 122. Regarding the design of the slanted cylindrical lenses 152, within each of the segments PH, each of the slanted cylindrical lenses 152 includes M*N portions P arranged side by side, in which M and N are natural numbers respectively. To be specific, within each of the segments PH, the pixel units are arranged periodically in the first direction D1, and M may be the number of the pixel units 122 covered by each of the slanted cylindrical lenses 152 in the first direction D1. For example, M may be the quotient of the length SL of the slanted cylindrical lenses 152 in the first direction D1 divided by the length L of the pixel units 122 in the first direction D1. Herein, M is 2. N may be the number of the pixel units 122 covered by one of the segments PH of the slanted cylindrical lenses 152 in the extension direction. For example, N may be the quotient of a length of the segments PH of the slanted cylindrical lenses 152 in the extension direction (not marked) divided by a length of the pixel units 122 in the extension direction (not marked). Herein, N is 2. According, each of the segments PH of the slanted cylindrical lenses 152 may send the M*N first imaging units M1 to M*N first viewing regions VR1, VR3, VR5, and VR7, and each of the segments PH of the slanted cylindrical lenses 152 may send the M*N second imaging units M2 to M*N second viewing regions VR2, VR4, VR6, and VR8. Since the position difference of the first imaging units M1 and the second imaging units M2, the first viewing regions VR1, VR3, VR5, and VR7 are not overlapped with the second viewing regions VR2, VR4, VR6, and VR8. As a result, a user may observe different images by right and left eyes in any adjacent two of the viewing regions VR1~VR8, such as the second viewing region VR2 and the first viewing region VR3, or the first viewing region VR3 and the second viewing region VR4.

In some embodiments of the present invention, the extension direction of the slanted cylindrical lenses 152 has a tilt angle δ with respect to the second direction, in which the tilt angle δ is $\tan^{-1}(1/M)$, such that each of the portions P is configured at least corresponding to one first imaging unit M1 and one second imaging unit M2.

Herein, a sum width D of the first imaging unit M1 and the second imaging unit M2 is the length L of the pixel units 122 multiplied by $\cos(\delta)/M$. As a result, the first imaging unit M1 and the second imaging unit M2 may be projected to the first viewing regions VR1, VR3, VR5, and VR7 and the second viewing regions VR2, VR4, VR6, and VR8 with a greatest range (area). In some embodiments, the imaging module 130 is capable of collecting the first light and the second light passing through the pixel units 122 of the image determining array 120 and forming the first imaging unit M1 and the second imaging unit M2 having the sum width D, which is the length L of the pixel units 122 multiplied by $\cos(\delta)/M$.

Herein, lights produced by the light source module 110 has exemplarily two different propagation directions, and therefore two imaging units are exemplarily formed by the lights passing through each of the pixel units. However, the number of the imaging units (the number of the different propagation directions of the lights produced by the light source module 110) should not limit the scope of the present invention. In actual applications, the light source module 110 may be configured to emit lights (such as parallel lights) having K propagation directions, such that lights passing through each of the pixel units may generate K image units, and the slanted cylindrical lenses 152 may send the K image units to K*M*N viewing regions.

In some embodiments of the present invention, by exploiting the spatial dividing element 150 (such as the slanted cylindrical lenses 152 having a plurality of segments PH) in accompany with the light source module 110 operated time-sequentially, the stereo display device 100 may increase the number of the viewing regions (including the first viewing regions VR1, VR3, VR5, and VR7 and the second viewing regions VR2, VR4, VR6, and VR8) which are the different spatial positions where lights are respectively send. Through the configuration, binocular parallax may be realized in any two adjacent viewing regions, such as the first viewing region VR1 and the second viewing region VR2, the second viewing region VR2 and the first viewing region VR3, or the first viewing region VR3 and the second viewing region VR4. Sweet spot means the region wherein a stereoscopic effect can be well realized by binocular parallax, and herein the sweet spot is referred to as the range of the first viewing region VR1 to the second viewing region VR8. However, the stereoscopic effect cannot be realized by binocular parallax at the edges of the region since the edges of the region is adjacent to the viewing regions related to another segment. For example, stereoscopic effect cannot be realized by binocular parallax in the range of the second viewing region VR8 and the first viewing region VR1 related to another segment. Herein, the number of the viewing region is increased by K times, and thereby enlarging the sweet spot and shrinking the range of the edge viewing regions where stereoscopic effect cannot be realized by binocular parallax.

Figure 4C:
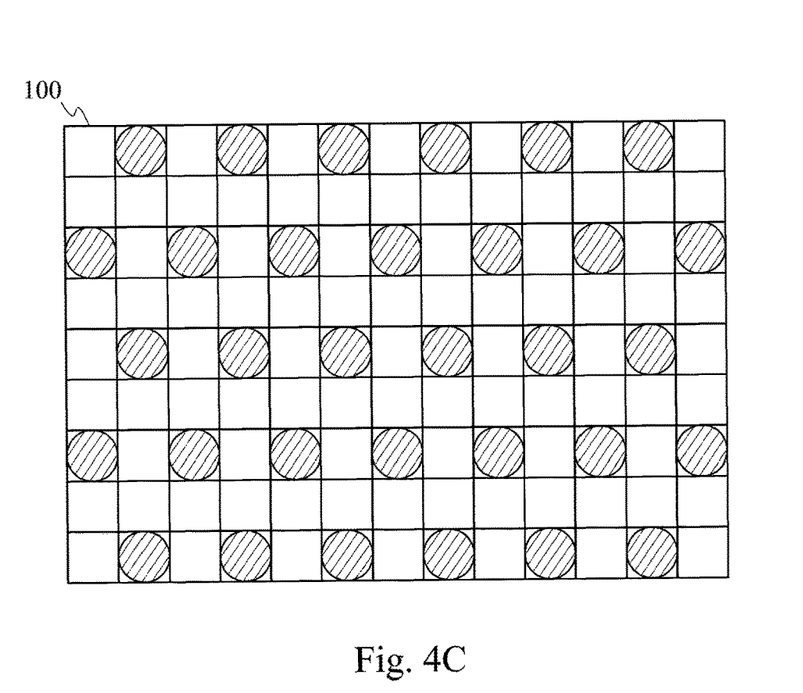
FIG. 4C is a schematic view showing a view of the stereo display device of FIG. 4A observed by a user.

Reference is made from FIGS. 4A to 4C. FIG. 4C is a schematic view showing a view of the stereo display device 100 of FIG. 4A observed by a user, in which the squares of the back ground indicate the boundaries of the pixel units (referring to FIG. 4A). Herein, the user may observe the stereo display device 100 in one of the first viewing regions VR1, VR3, VR5, and VR7 or one of the second viewing regions VR2, VR4, VR6, and VR8. In the present embodiments, two light sources operated time-sequentially are taken as examples (i.e. K is 2), and a segment PH of the slanted cylindrical lenses 152 covers four first image units M1 and four second image units M2, which means one of the slanted cylindrical lenses 152 has four portions P, M is 2, and N is 2. Accordingly, after calculation, the tilt angle δ of the slanted cylindrical lenses 152 is 26.6 degrees, and the width D of the first imaging unit M1 and the second imaging unit M2 is the length L of the pixel units 122 multiplied by 0.447. Since a 2*2 spatial-multiplex method is cooperated with a time-multiplex method adopting two time-sequential light sources, 8 viewing regions can be generated, in which every two viewing regions are generated by the same pixel unit. As a result, the resolution of the stereo display device 100 may be decreased to ¼ of the original resolution.

Of course, it should not limit the scope of the present invention. The designed value may vary in other embodiments.

Figure 5A:
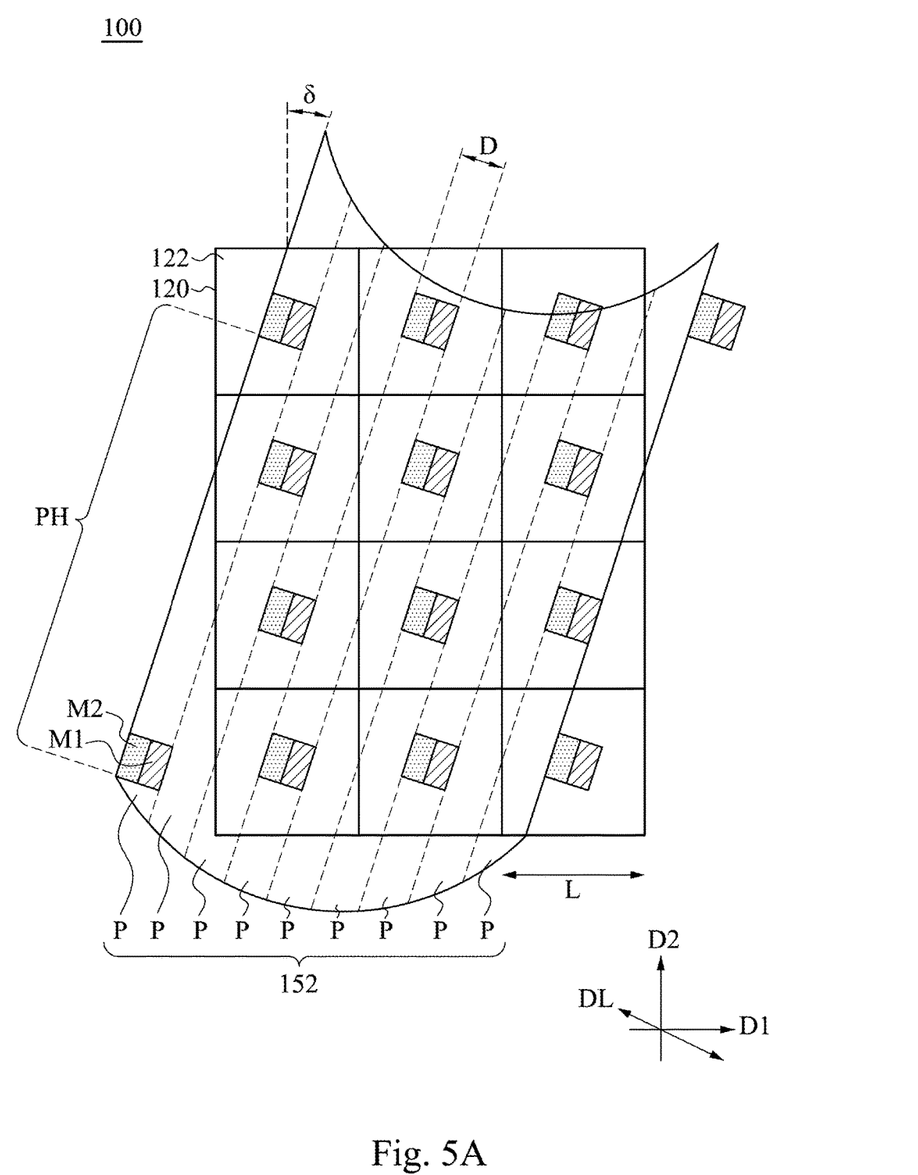
FIG. 5A is a schematic top view of a portion of elements of a stereo display device according to another embodiment of this invention.
Figure 5B:
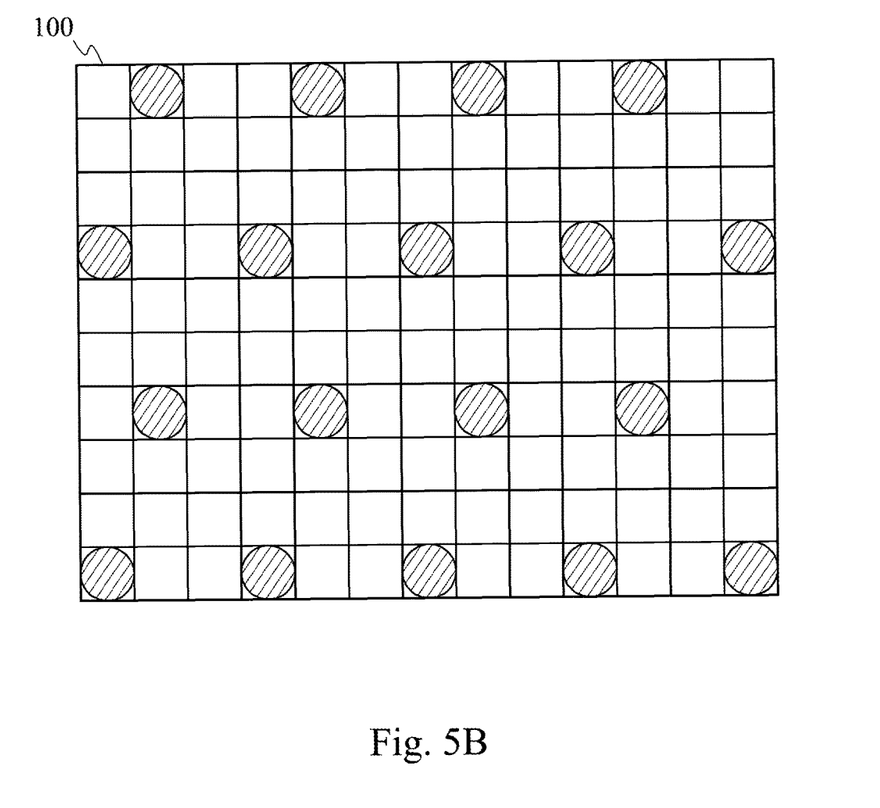
FIG. 5B is a schematic view showing a view of the stereo display device of FIG. 5A observed by a user.

Reference is made from FIGS. 5A to 5C. FIG. 5A is a schematic top view of a portion of elements of a stereo display device 100 according to another embodiment of this invention. FIG. 5B is a schematic view showing a view of the stereo display device 100 of FIG. 5A observed by a user. In the present embodiments, two light sources operated time-sequentially are taken as examples (i.e. K is 2), and a segment PH of the slanted cylindrical lenses 152 covers nine first image units M1 and nine second image units M2, which means one of the slanted cylindrical lenses 152 has nine portions P, M is 3, and N is 3. Accordingly, after calculation, the tilt angle δ of the slanted cylindrical lenses 152 is 18.4 degrees, and the width D of the first imaging unit M1 and the second imaging unit M2 is the length L of the pixel units 122 multiplied by 0.3163. Since a 3*3 spatial method is cooperated with a time-multiplex method adopting two time-sequential light sources, 18 viewing regions can be generated, in which every two viewing regions are generated by the same pixel unit. As a result, the resolution of the stereo display device 100 may be decreased to ⅑ of the original resolution.

Other details of the present embodiments are substantially as that of the previously description, and not repeated herein.

In the embodiments of the present invention, by exploiting a spatial dividing element in accompanied by sequential imaging of light source, a number of viewing regions of different spatial positions where lights are transmitted can be increased, thereby enhancing the range of viewing sweet spot and reducing the range of edge viewing regions where a stereoscopic display cannot be achieved by binocular parallax.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A stereo display device, comprising:
   a light source assembly;
   an image determining array, comprising a plurality of pixel units, wherein each of the pixel units receives a first light and a second light emitted from the light source assembly, and time-sequentially provides a first information to the first light and a second information to the second light, wherein the first light and the second light propagate in different directions;
   an imaging lens device, disposed adjacent to the image determining array, wherein the imaging lens device is optically coupled to the image determining array, and the imaging lens device receives the first light from the pixel units to form a plurality of first imaging units and receives the second light from the pixel units to form a plurality of second imaging units; and
   a spatial dividing element optically coupled to the imaging lens device, wherein the spatial dividing element receives the first image units and sends the first image units to a plurality of first viewing regions respectively, and the spatial dividing element receives the second image units and sends the second image units to a plurality of second viewing regions respectively, wherein the first viewing regions and the second viewing regions are not overlapped, and two of the first image units corresponding to adjacent two of the pixel units are transmitted to the first viewing regions in different directions.

2. The stereo display device of claim 1, wherein the first light and the second light are substantially parallel lights propagating in the different directions.

3. The stereo display device of claim 1, wherein the spatial dividing element comprises a plurality of slanted cylindrical lenses, the pixel units are arrayed in a first direction and a second direction, and an extending direction of the slanted cylindrical lenses is not parallel with the first direction and the second direction, wherein each of the slanted cylindrical lenses in the first direction covers M number of the pixel units, wherein M is a positive integer, and each of the slanted cylindrical lenses has a slant angle δ of tan-1(1/M).

4. The stereo display device of claim 3, wherein a sum width of each of the first image units and each of the second image units is cos(δ)/M times a length of the pixel units of the image determining array.

5. The stereo display device of claim 1, further comprising:
   a diffusing film, wherein the first image units and the second image units are formed thereon.

6. The stereo display device of claim 1, wherein the imaging lens device comprises a plurality of lenses, and each of the lenses is disposed corresponding to each of the pixel units.

7. The stereo display device of claim 1, wherein the imaging lens device comprises:
   a first cylindrical lens, disposed at a side of the image determining array; and
   a second cylindrical lens, disposed at another side of the image determining array, wherein an extension direction of the first cylindrical lens is substantially orthogonal to an extension direction of the second cylindrical lens.

8. The stereo display device of claim 1, wherein the light source assembly comprises:
   at least one first light source and at least one second light source, respectively radiating a first radiated light and a second radiated light; and
   a lens optically coupled to the at least one first light source and at least one second light source, wherein the lens converts the first radiated light and the second radiated light to the first light and the second light, which are parallel lights.

9. The stereo display device of claim 8, wherein the light source assembly further comprises a controller connected to the first light source and the second light source.

10. The stereo display device of claim 1, wherein the light source assembly comprises:
   a light source array, comprising a plurality of light source components arranged in an array, wherein each of the light source components comprises a first light source and a second light source, respectively radiating a first radiated light and a second radiated light; and
   a lens array optically coupled to the light source array, wherein the lens array converts the first radiated light and the second radiated light to the first light and the second light, which are parallel lights, and each of the light source components is disposed corresponding to a lens of the lens array.

* * * * *